United States Patent
Walsh et al.

(10) Patent No.: US 12,278,908 B2
(45) Date of Patent: Apr. 15, 2025

(54) LASER SCANNER CONFIGURED TO GENERATE A DIGITAL CHAIN OF CUSTODY

(71) Applicant: LEICA GEOSYSTEMS AG, Heerbrugg (CH)

(72) Inventors: Gregory Charles Walsh, Walnut Creek, CA (US); Daniel Marty, Bad Ragaz (CH)

(73) Assignee: LEICA GEOSYSTEMS AG, Heerbrugg (CH)

( * ) Notice: Subject to any disclaimer, the term of this patent is extended or adjusted under 35 U.S.C. 154(b) by 217 days.

(21) Appl. No.: 17/821,091

(22) Filed: Aug. 19, 2022

(65) Prior Publication Data

US 2024/0064022 A1 Feb. 22, 2024

(51) Int. Cl.
*H04L 9/32* (2006.01)
*H04L 9/08* (2006.01)
*H04L 9/30* (2006.01)

(52) U.S. Cl.
CPC ............ *H04L 9/3247* (2013.01); *H04L 9/088* (2013.01); *H04L 9/30* (2013.01)

(58) Field of Classification Search
CPC .......... H04L 9/3247; H04L 9/088; H04L 9/30
USPC ......................................................... 713/171
See application file for complete search history.

(56) References Cited

U.S. PATENT DOCUMENTS

| | | | | |
|---|---|---|---|---|
| 7,856,554 | B2* | 12/2010 | Lapstun | G06K 19/06009 713/176 |
| 8,812,854 | B2* | 8/2014 | Shah | H04L 9/30 713/176 |
| 2006/0020811 | A1* | 1/2006 | Tan | H04L 63/126 713/180 |
| 2010/0316251 | A1* | 12/2010 | Cowburn | G07D 7/004 382/100 |
| 2014/0149735 | A1* | 5/2014 | Tenenboym | H04L 63/0823 713/176 |
| 2019/0044726 | A1* | 2/2019 | Macieira | H04L 67/04 |

(Continued)

OTHER PUBLICATIONS

European Search Report, as issued in connection with European Application No. 23190877.3, dated Nov. 16, 2023, 9 pgs.

(Continued)

*Primary Examiner* — Dant B Shaifer Harriman
(74) *Attorney, Agent, or Firm* — MASCHOFF BRENNAN

(57) ABSTRACT

A laser-scanning method may include obtaining scan data captured by a laser scanner in which the laser scanner includes a first private key that uniquely corresponds to the laser scanner. The laser-scanning method may include obtaining a first digital signature corresponding to the obtained scan data that is generated based on the scan data and the first private key. The laser-scanning method may include validating the first digital signature using a first public key that corresponds to the first private key and generating a report that summarizes results of the validating. The laser-scanning method may include transforming and aggregating, by a scan data aggregator, the scan data as aggregated scan data and generating a second digital signature corresponding to the aggregated scan data. The second digital signature may be generated by signing hashes corresponding to the aggregated scan data using a second private key corresponding to the scan data aggregator.

17 Claims, 7 Drawing Sheets

(56) References Cited

U.S. PATENT DOCUMENTS

| | | | |
|---|---|---|---|
| 2020/0019717 A1* | 1/2020 | Steffey | H04L 9/3239 |
| 2020/0242354 A1* | 7/2020 | Ligman | H04L 9/0637 |
| 2021/0026991 A1* | 1/2021 | Ossig | H04L 9/3297 |
| 2021/0184864 A1* | 6/2021 | Wentz | H04L 9/3218 |
| 2022/0158846 A1* | 5/2022 | Ray | H04L 63/0807 |
| 2023/0376636 A1* | 11/2023 | Ossig | H04L 9/3239 |

OTHER PUBLICATIONS

Joshua, Joy, "Vehicular Blocktrees", 2017 IEEE Vehicular Networking Conference (VNC), IEEE, Nov. 27, 2017, pp. 147-150.

* cited by examiner

LASER SCANNER CONFIGURED TO GENERATE A DIGITAL CHAIN OF CUSTODY

The present disclosure generally relates to a laser scanner configured to generate a digital chain of custody for data captured by the laser scanner.

BACKGROUND

A laser scanner may be an apparatus configured to direct one or more laser beams towards an environment around the laser scanner and detect laser beams that are refracted, reflected, or otherwise scattered by objects included in the surrounding environment. By measuring an intensity of a given scattered laser beam that is detected by the laser scanner, a distance to a particular point in the vicinity of the laser scanner may be determined. By collecting hundreds, thousands, millions, or billions of scattered laser beam intensities, surface shapes of objects and a topography of the environment around the laser scanner may be modeled in three dimensions.

The subject matter claimed in the present disclosure is not limited to embodiments that solve any disadvantages or that operate only in environments such as those described above. Rather, this background is only provided to illustrate one example technology area where some embodiments described in the present disclosure may be practiced.

SUMMARY

According to an aspect of an embodiment, a laser-scanning method may include obtaining scan data captured by a laser scanner in which the laser scanner includes a first private key that uniquely corresponds to the laser scanner. The laser-scanning method may include obtaining a first digital signature corresponding to the obtained scan data that is generated based on the scan data and the first private key. The laser-scanning method may include validating the first digital signature using a first public key that corresponds to the first private key and generating a report that summarizes results of the validating. The laser-scanning method may include transforming and aggregating, by a scan data aggregator, the scan data and any other data captured by the laser scanner as aggregated scan data and generating a second digital signature corresponding to the aggregated scan data. The second digital signature may be generated by signing hashes corresponding to the aggregated scan data using a second private key corresponding to the scan data aggregator.

The object and advantages of the embodiments will be realized and achieved at least by the elements, features, and combinations particularly pointed out in the claims. It is to be understood that both the foregoing general description and the following detailed description are explanatory and are not restrictive of the invention, as claimed.

BRIEF DESCRIPTION OF THE DRAWINGS

Example embodiments will be described and explained with additional specificity and detail through the accompanying drawings in which.

DETAILED DESCRIPTION

Figure 1:
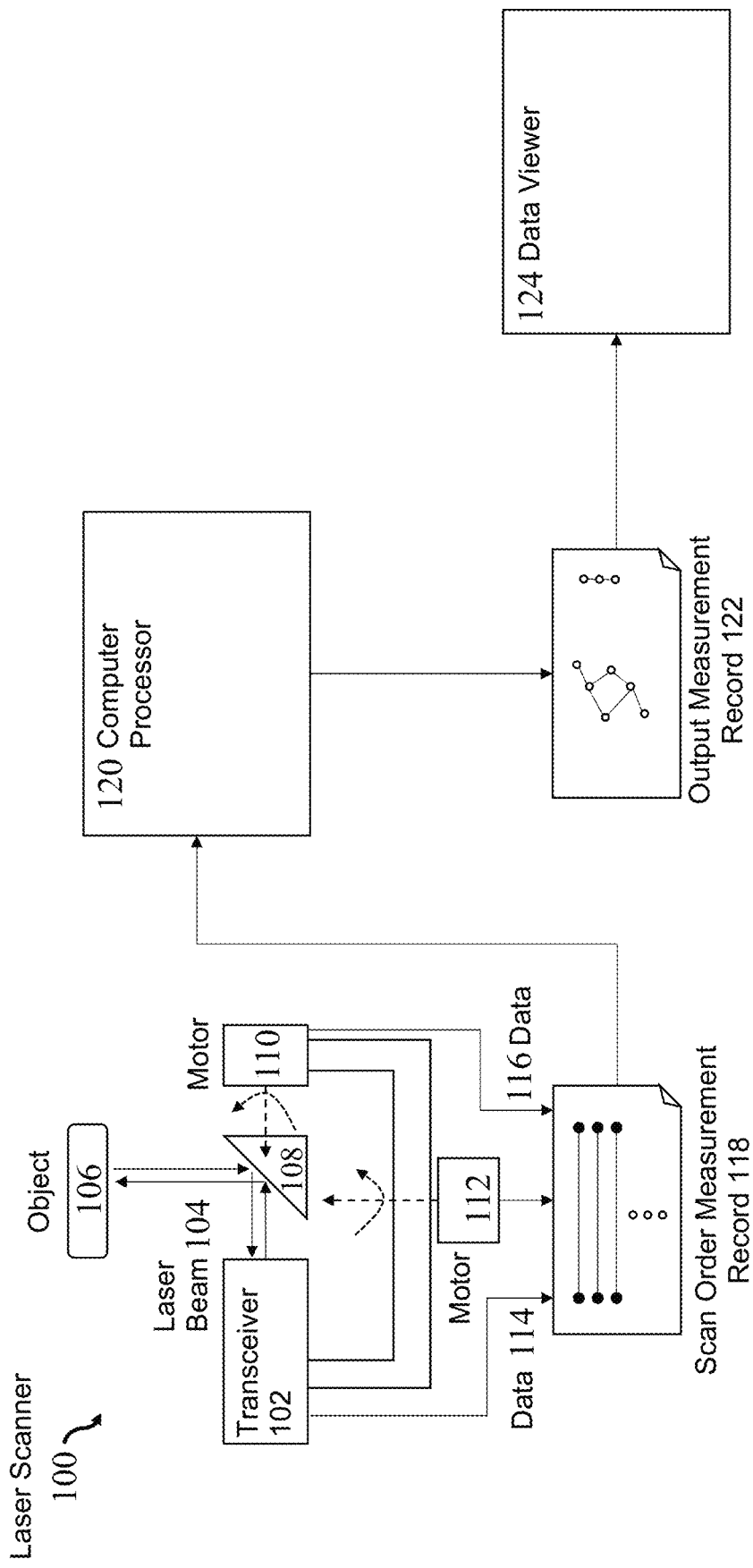
FIG. 1 is a diagram of an example embodiment of a laser scanner according to at least one embodiment of the present disclosure.

A laser scanner may be used to collect three-dimensional ("3D") data and two-dimensional ("2D") data relating to an environment around the laser scanner. The 3D data may include laser scans of the environment, and the 2D data may include images captured by a camera sensor associated with the laser scanner. Additionally or alternatively, the laser scanner may be configured to capture other sensor data relating to the environment, such as audio data, temperature data, humidity data, timestamps, or some combination thereof. Data collected relating to the environment (herein collectively referred to as "scan data") may be sent to a scan data aggregator that compiles scan data from multiple laser scanners. Additionally or alternatively, the scan data may be sent to a scan data editor so that new elements (e.g., annotations, arrows, highlighting, or any other comments) may be added to the scan data or existing elements in the scan data may be modified.

In some situations, the laser scanner may be used to survey and capture information for a site of interest, such as a crime scene or a scene of a car accident. In these and other situations, the integrity of the data collected by the laser scanner may be important because the data may be presented as evidence in a court of law. Because the collected data may be presented as evidence in the court of law, being able to verify that the scan data has not been tampered with may be an important consideration during collection, aggregation, or editing of the scan data. A digital chain of custody that verifies the integrity of the scan data may be established by hashing and signing the scan data captured by the laser scanner so that any changes to the scan data may be detected during verification of the scan data. Accessing or viewing the scan data, however, may be difficult because different laser scanners present collected scan data in varying data formats that may even be proprietary to a particular brand of laser scanners. Additionally or alternatively, a given laser scanner may or may not be configured to process the scan data before presenting the scan data as evidence. As such, the information provided by the given laser scanner may or may not be readily interpretable by a human viewer of the scan data.

The present disclosure may relate to, among other things, a method and a system of collecting scan data and generating a digital chain of custody that preserves the integrity of the scan data. The digital chain of custody generated according to at least one embodiment of the present disclosure may verify the integrity of the scan data at any step involving the scan data, including collection of the scan data, aggregation of the scan data, editing of the scan data, or some combination thereof. In some embodiments, a given laser scanner according to at least one embodiment of the present disclosure may include a private key that is unique to the given laser scanner, and the given laser scanner may be configured to hash scan data and sign the hashed scan data using the given laser scanner's private key. The scan data collected by the given laser scanner and the digital signature may be sent to a scan data aggregator or a scan data editor that are configured to verify the digital signature using a public key corresponding to the given laser scanner's private key. Responsive to successfully verifying the digital signature, the scan data aggregator or the scan data editor may respectively aggregate obtained scan data or make revisions to obtained scan data and digitally sign the aggregated or the edited scan data using private keys that correspond to the scan data aggregator or the scan data editor. Verification of the digital signature generated by the scan data aggregator or the scan data editor may involve a public key that corresponds to the private key of the scan data aggregator or the scan data editor. Successful verification of the aggregated or the edited scan data may indicate that the digital chain of custody has been preserved and that the scan data has not been tampered with at any step in the data collection, aggregation, or editing processes.

Embodiments of the present disclosure are explained with reference to the accompanying figures.

FIG. 1 is a diagram of an example embodiment of a laser scanner 100 according to at least one embodiment of the present disclosure. A high-speed Light Detection And Ranging (LIDAR) transceiver 102 may be configured to emit laser beams and capture rebounding beams deflected by surfaces or objects in the surrounding environment around the laser scanner 100, such as an object 106. The emitted and collected laser beams, represented as laser beams 104, may be directed towards the object 106 by a deflection mirror 108 and upon reflection off of the surface of the object 106, the laser beams 104 may be received by the laser scanner 100.

In some embodiments, the deflection mirror 108 may be positioned at different angles to direct the laser beams 104 at different, corresponding angles and facilitate measurement of a wider range of space in the environment around the laser scanner 100. To adjust the angle of orientation of the deflection mirror 108, the laser scanner 100 may include a tilt-axis motor 110 and a standing-axis motor 112 that allow adjustment of the deflection mirror 108 within two degrees of freedom (e.g., in a left-right direction and in an up-down direction). In these and other embodiments, the laser scanner 100 may include a computer processor 120 that takes the intensities of deflected laser beams 104 collected by the high-speed LIDAR transceiver 102, a tilt axis as set by the tilt-axis motor 110, and a standing axis as set by the standing-axis motor 112 and computes a coordinate data point in three-dimensional space corresponding to each deflected laser beam 104.

Additionally or alternatively, the laser scanner 100 may include a scan order measurement record 118 that receives range measurement data 114 from the high-speed LIDAR transceiver 102 and angle measurement data 116 from the tilt-axis motor 110 and the standing-axis motor 112. The scan order measurement record 118 may pair the range measurement data 114 with corresponding angle measurement data 116 based on a time at which each datum of the range measurement data 114 and the angle measurement data 116 was collected. Additionally or alternatively, the range measurement data 114 and the angle measurement data 116 may include a count, a serial number, or another sequential identifier matched to the collected data, and datum pairs of the range measurement data 114 and the angle measurement data 116 may be identified based on the range measurement data 114 and the angle measurement data 116 having the same sequential identifier.

In some embodiments, the computer processor 120 may spatially organize the scan data included in the scan order measurement record 118 to output a spatial output measurement record 122. The laser scanner 100 may be configured to collect raw laser scan data in the scan order included in the scan order measurement record 118, which may or may not be spatially organized. Because the raw laser scan data may not be spatially organized, a user reviewing the raw laser scan data may not be able to coherently understand the environment represented by the raw laser scan data. The spatial output measurement record 122 may include an arrangement of the scan data organized such that nearby three-dimensional data points are near one another, and the scan data forms a spatially coherent representation of the environment around the laser scanner 100 that is more readily viewable by a user via a data viewer 124. In these and other embodiments, the data viewer 124 may be a graphical display included with the laser scanner 100.

Modifications, additions, or omissions may be made to the laser scanner 100 without departing from the scope of the present disclosure. For example, the designations of different elements in the manner described is meant to help explain concepts described herein and is not limiting. For instance, in some embodiments, the high-speed LIDAR transceiver 102, the deflection mirror 108, the tilt-axis motor 110, the standing-axis motor 112, the scan order measurement record 118, the computer processor 120, the spatial output measurement record 122, and the data viewer 124 are delineated in the specific manner described to help with explaining concepts described herein but such delineation is not meant to be limiting. Further, the laser scanner 100 may include any number of other elements or may be implemented within other systems or contexts than those described.

Figure 2:
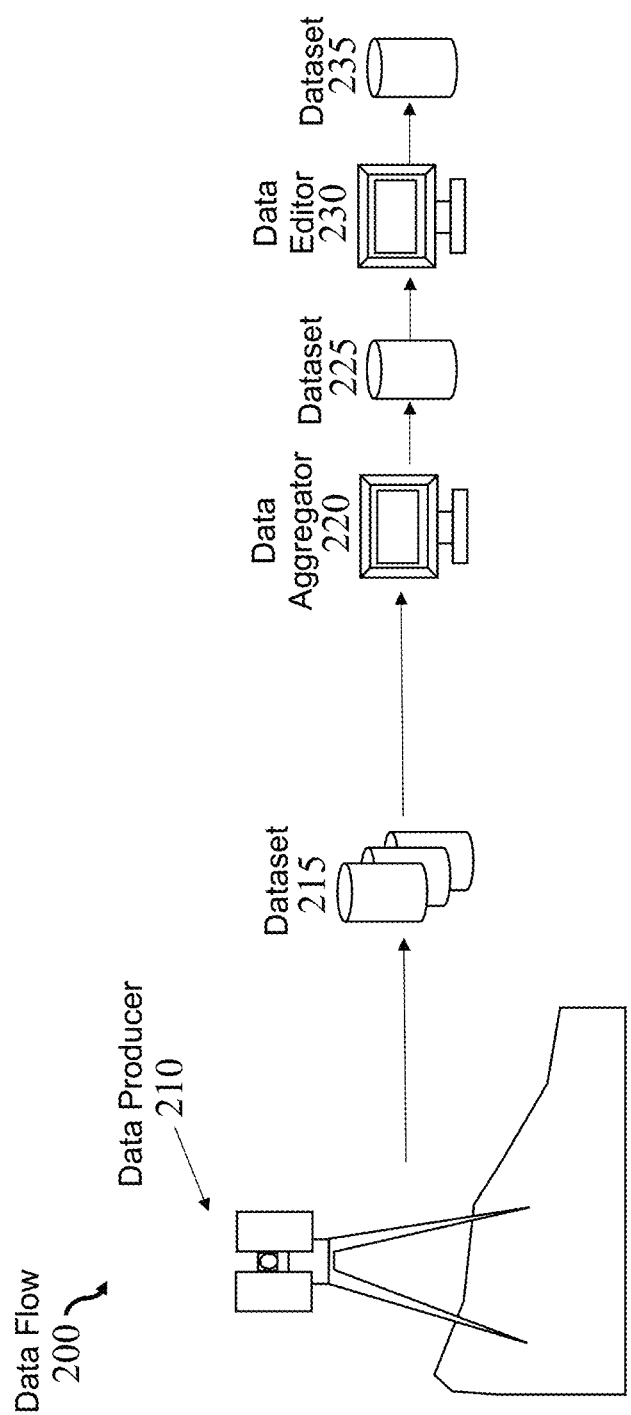
FIG. 2 is a diagram of an example embodiment of a data flow associated with a digital chain of custody according to at least one embodiment of the present disclosure.

FIG. 2 is a diagram of an example embodiment of a data flow 200 associated with a digital chain of custody according to at least one embodiment of the present disclosure. The data flow 200 may include a data producer 210, a data aggregator 220, and a data editor 230 that are configured to output signed datasets 215, 225, and 235, respectively. In some embodiments, the data producer 210 may include the laser scanner 100 described in relation to FIG. 1. Any changes to the scan data collected by the data producer 210 after generating the signed dataset 215 may cause a digital signature generated in relation to the changed scan data to fail to match the signed dataset 215. Consequently, undetectable changes to the scan data may not be made as the digital signature corresponding to the signed dataset 215 would change in response to any such changes being made to the scan data.

The data aggregator 220 may be configured to obtain scan data from the data producer 210, which may include the signed dataset 215, and output an aggregated dataset that the data aggregator 220 then digitally signs to generate the signed dataset 225. In some embodiments, the signed dataset 215 obtained by the data aggregator 220 may or may not be retained by the data aggregator 220. Instead of retaining the scan data included in the signed dataset 215, the data aggregator 220 may retain a verification report relating to validation of the scan data included in the signed dataset 215 and a link to the scan data without retaining the scan data itself. Because the scan data may involve millions or even billions of laser scan data points, the scan data may include large file sizes that utilize a significant amount of disk space, and choosing to not store the scan data may save disk space for the data aggregator 220.

The data editor 230 may obtain the signed dataset 215 from the data producer 210 or the signed dataset 225 from the data aggregator 220, and a user may revise the scan data included in the signed datasets 215 or 225. The data editor 230 may digitally sign the dataset including the revised scan data to generate the signed dataset 235. In some embodiments, the data editor 230, like the data aggregator 220, may choose to not locally store the scan data corresponding to the signed dataset 215 and instead save any edited or new objects in the signed dataset 235 without the original scan data. In these and other embodiments, the signed dataset 235 may be a nested file that includes preserved versions of past data object and digital signature revisions made by other users using data editors aside from the data editor 230. One or more of the past data object and digital signature revisions may be accessed from the signed dataset 235.

In some embodiments, the signed datasets 215, 225, or 235 may be sealed to prevent editing of the signed datasets 215, 225, or 235 via a data editor, such as the data editor 230. Sealing the signed datasets 215, 225, or 235 may involve converting the files corresponding to the signed datasets 215, 225, or 235 into read-only formats.

Figure 3:
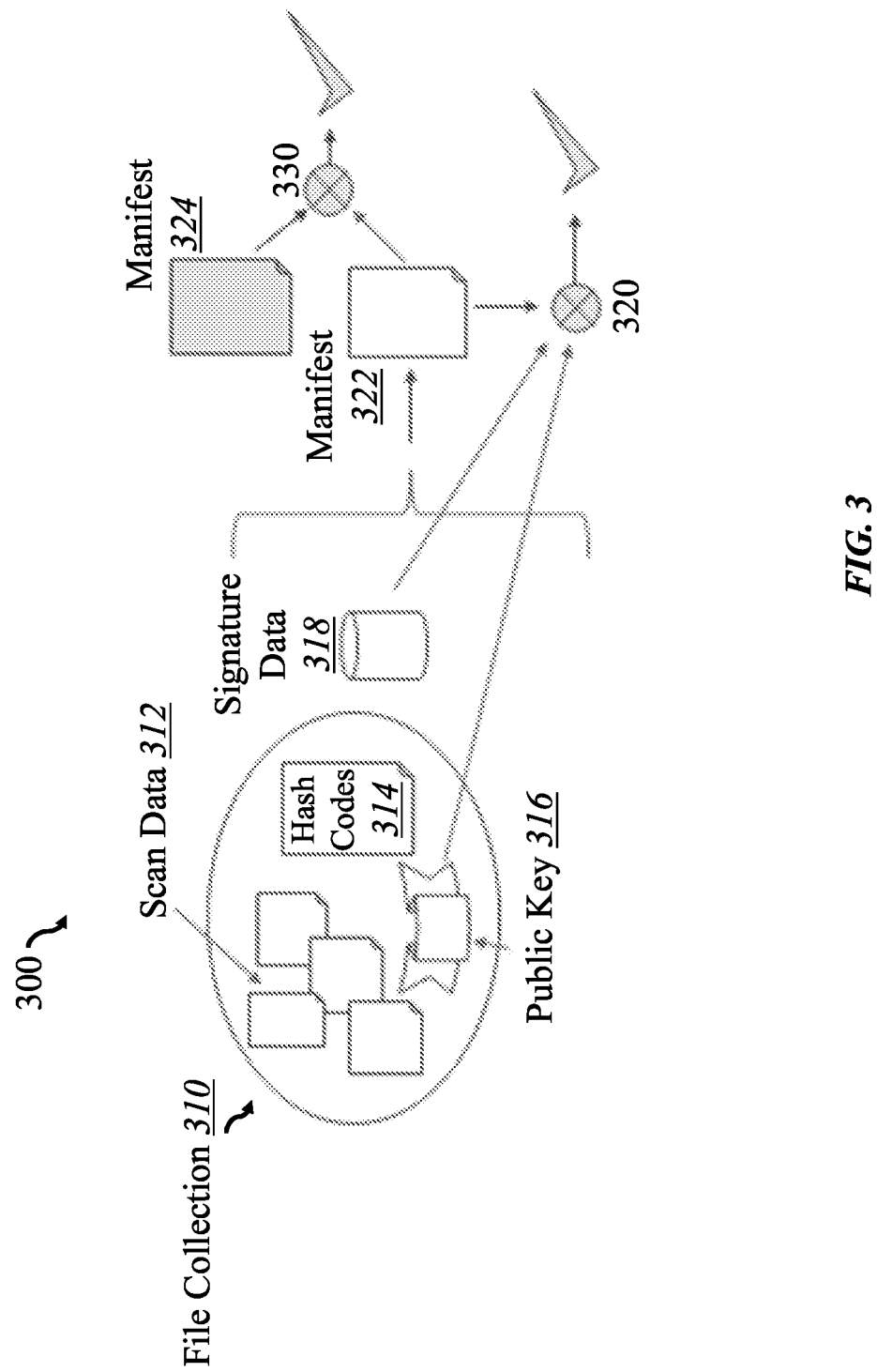
FIG. 3 illustrates an example embodiment of a single data verification that involves data collected by the laser scanner according to at least one embodiment of the present disclosure.

FIG. 3 illustrates an example embodiment of a single data verification process 300 that involves scan data 312 collected by a laser scanner according to at least one embodiment of the present disclosure. In some embodiments, the single data verification process 300 may be applied to the signed dataset 215 of the data producer 210 or the spatial output measurement record 122 of the laser scanner 100 as described in relation to FIGS. 2 and 1, respectively.

The single data verification process 300 may involve a file collection 310 that includes the scan data 312 collected by a laser scanner and hash codes 314 that are generated by hashing the scan data 312. Generating the hash codes 314 may involve computations using a cryptographic hashing algorithm, such as SHA-2, SHA3-256, or any other cryptographic hashing algorithms that are approved for use in hashing data for presentation in a court of law. The hash codes 314 and file paths associated with the hash codes 314 may be compiled as a manifest 322.

Additionally or alternatively, the file collection 310 may include a public key 316 that corresponds to a private key used to digitally sign the collected scan data 312 via a trapdoor function, such as the Rivest-Shamir-Adleman (RSA) algorithm, the Diffie-Hellman key exchange protocol, or any other asymmetric cryptographic algorithms. In some embodiments, the public key 316 may be stored in a standard certificate format, such as the X.509 format. The X.509 format and any other public key certificate formats may include an identity of the signer using the public key 316, the signing algorithm used, a signature of the public key certificate, and a reference to a remotely located store of public keys 316 to allow verification of the public key certificate. Using the X.509 format may facilitate upgrading and improving the cryptographic infrastructure for future technological updates.

The public key 316 itself may be verified before being used for verification of digital signatures. In some embodiments, verifying the public key 316 may involve identifying an X.509 certificate, or any other format certificate, associated with the public key 316 and checking the format certificate using an X5.09 public key, or any other format's root certificate or public key. The public key 316 may be added to a whitelist of trusted data sources after validation of the public key 316 by the root certificate in which the whitelist may or may not be user-specific or laser-scanner-specific.

In some embodiments, a given private key may correspond to a specific laser scanner used to collect the scan data 312, a specific user who operated a laser scanner to collect the scan data 312, or some combination thereof. The given private key may be stored in an off-system data storage that is not physically or logically associated with the specific laser scanner. For example, the off-system data storage may include or be included in a cloud service with which the specific laser scanner that the given private key corresponds with is configured to communicate. In these and other embodiments, the cloud service may be implemented as a digital notary service in which the cloud service provides secured log-in credentials for users that may access a given laser scanner. The cloud service may include a data storage that includes private keys corresponding to users of the given laser scanner and a two-factor or a multi-factor authentication process to accurately determine an identity of any of the users corresponding to the stored private keys. In these and other embodiments, attempts to access the given laser scanner by a given user may involve an attempted access of the cloud service in which case the attempted access or a corresponding digital signature event may be recorded to establish a time, a location, some other information regarding the attempted access, or some combination thereof.

The digital signature generated by signing the scan data 312 using the private key may be represented by signature data 318. The manifest 322 may be verified during a first verification step 320 by comparing the manifest 322 to the provided public key 316 and the signature data 318. A second manifest 324 may be generated using the file collection 310, and the manifest 322 and the second manifest 324 may be compared to each other. Responsive to determining that the manifest 322 matches the second manifest 324 during a second verification step 330, it may be concluded that the scan data 312 included in the file collection 310 is secure and untampered.

Figure 4:
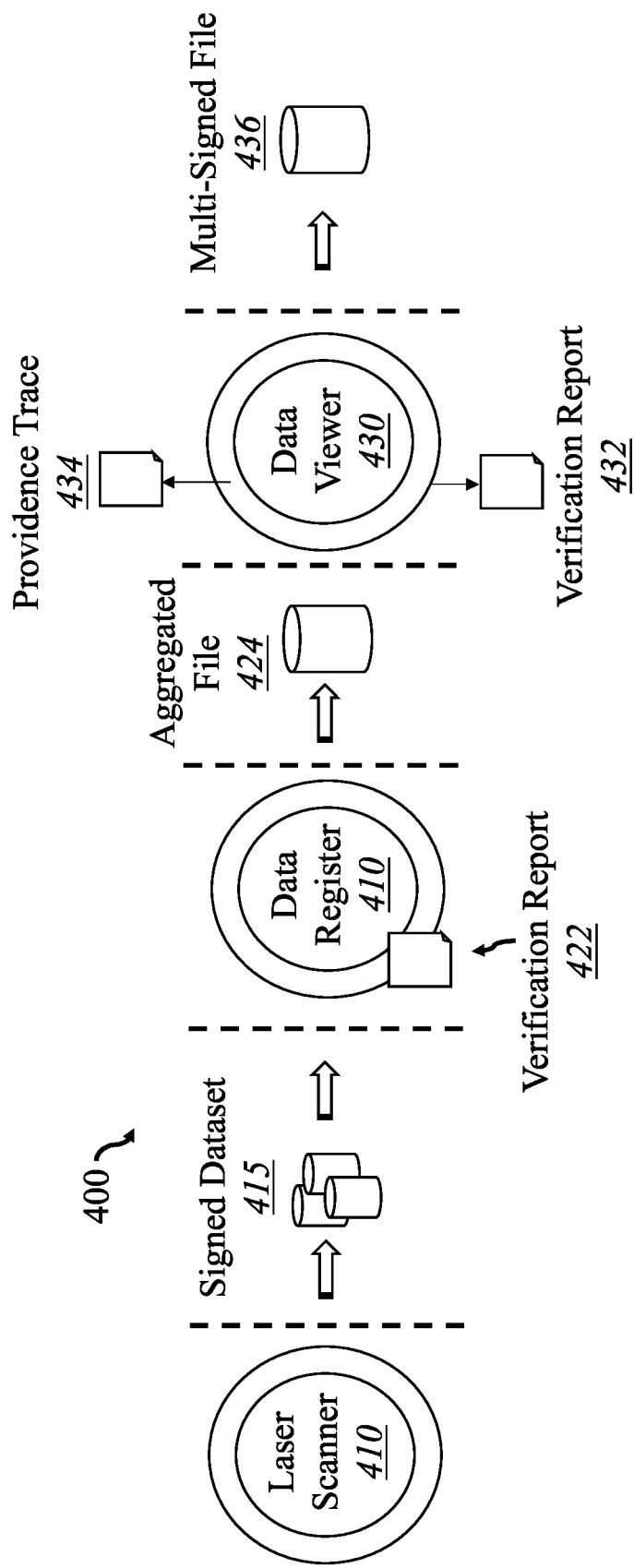
FIG. 4 is a diagram of an example embodiment of a digital chain of custody according to at least one embodiment of the present disclosure.

FIG. 4 is a diagram of an example embodiment of a digital chain of custody 400 according to at least one embodiment of the present disclosure. The digital chain of custody 400 may be generated or appended to at each secure computing environment in which scan data may be worked with, including a laser scanner 410, a data register 420, or a data viewer 430. The digital chain of custody 400 may be generated at the laser scanner 410 in which the laser scanner 410 obtains the scan data and outputs a signed dataset 415. The signed dataset 415 may be generated by digitally signing scan data as described in relation to the single data verification process 30 of FIG. 3. The signed dataset 415, and any other signed datasets generated by other laser scanners, may be obtained by the data register 420, which may verify the integrity of the signed dataset 415 as described in relation to the single data verification process 30 of FIG. 3 and output a verification report 422 that indicates whether the obtained signed datasets 415 have not been tampered with. Additionally or alternatively, the verification report 422 may include data elements originating from different laser scanners aside from the laser scanner 410 or multiple data elements (e.g., multiple laser scan jobs) from the laser scanner 410. In these and other embodiments, the verification report 422 may include a link, such as an identification number, to the data element to which the verification report 422 relates. The data register 420 may aggregate the signed datasets 415 and output an aggregated file 424 that is signed by the data register 420.

The data viewer 430 may obtain the aggregated file 424 or one or more signed datasets 415 from the laser scanner 410. In some embodiments, the data viewer 430 may also generate a verification report 432 like the verification report 422 generated by the data register 420 by computing a digital signature based on the aggregated file 424 and a public key provided by the data register 420 or the signed dataset 415 and a public key provided by the laser scanner 410. Additionally or alternatively, the data viewer 430 may be configured to generate a providence trace 434 that lists the origins of the scan data (e.g., by which laser scanner 410 the scan data was collected and by which operator of the laser scanner 410 was the scan data collected) or the source of any scan data modifications added in the data viewer 430 or any other data viewers. The data viewer 430 may be configured to digitally sign an edited scan dataset using the data viewer's private key and output a multi-signed file 436. The multi-signed file 436 may be obtained by another data viewer, such as a second data viewer being operated by a user different from the user who operates the data viewer 430, and the authenticity of the edited scan data included in the multi-signed file 436 may be verified by the second data viewer using a public key corresponding to the data viewer 430 using a second providence trace.

Figure 5:
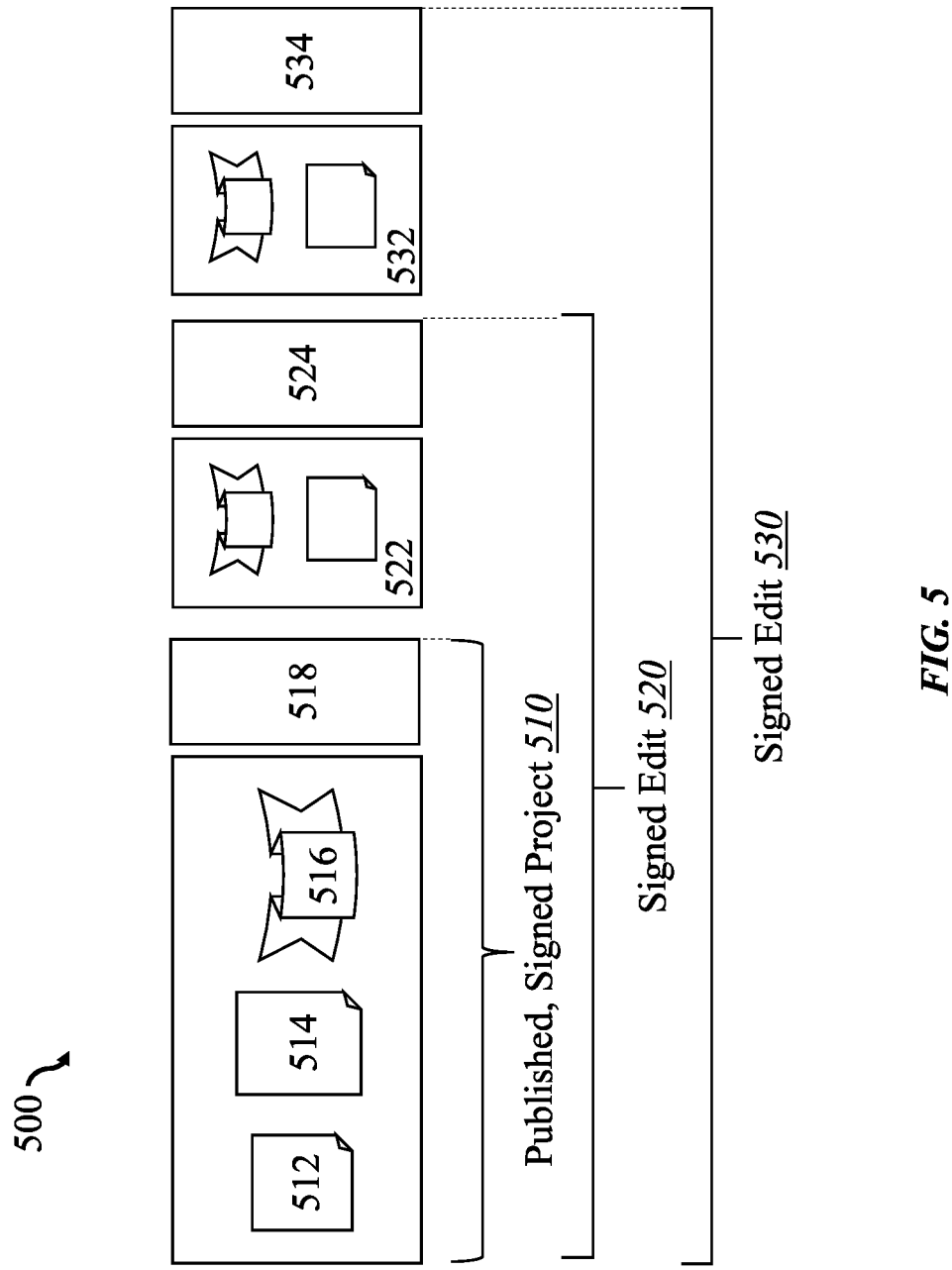
FIG. 5 illustrates an example embodiment of a nested signed-save data according to at least one embodiment of the present disclosure.

FIG. 5 illustrates an example embodiment of nested signed-save data 500 according to at least one embodiment of the present disclosure. In some embodiments, the nested signed-save data 500 may represent data generated during the data flow 200 of FIG. 2 or the digital chain of custody 400 of FIG. 4. The nested signed-save data 500 may include a published, signed project 510 that includes scan data 512, hash codes 514 of the scan data 512, a public key 516, and a digital signature 518 generated using the scan data 512 and a private key associated with the public key 516. The published, signed project 510 may be obtained by a first data editor 520 and a second data editor 530, such as the data viewer 430 of FIG. 4, in which each of the first data editor 520 and the second data editor 530 appends edited scan data 522 and 532 to the published, signed project 510. Additionally or alternatively, the first data editor 520 and the second data editor 530 may append a first digital signature 524 and 534 to the nested signed-save data 500.

Figure 6:
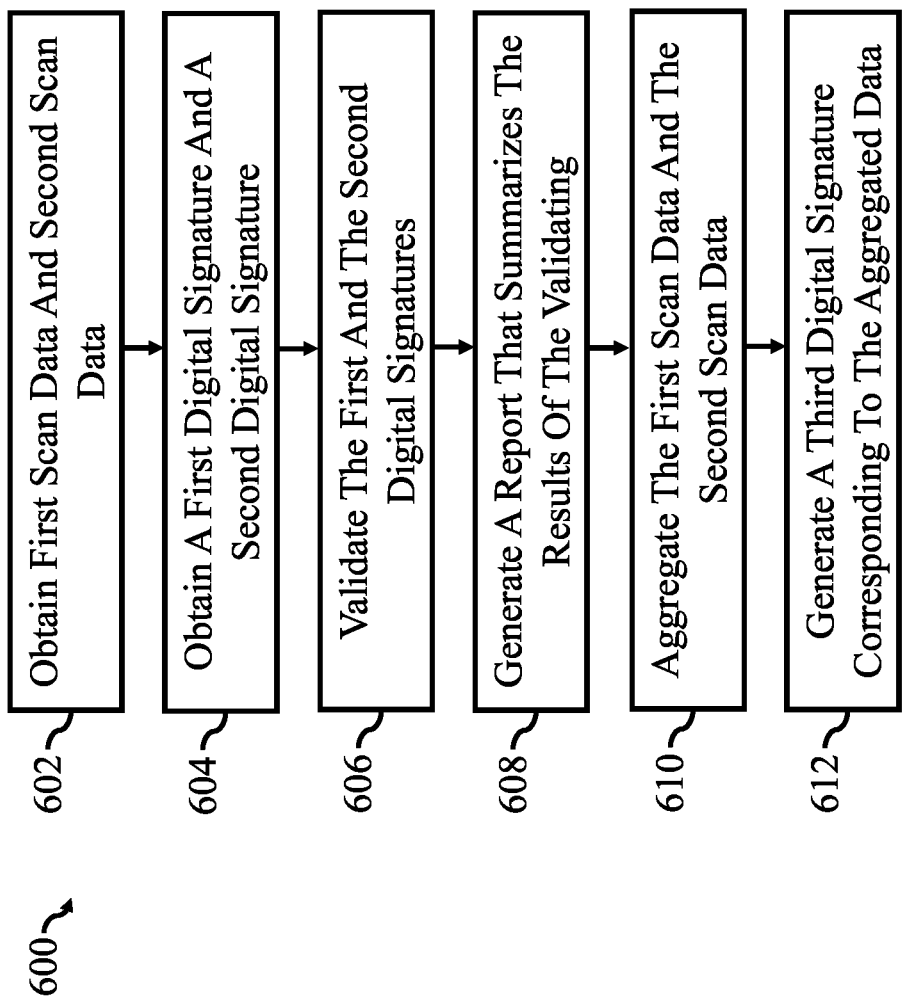
FIG. 6 is a flowchart of an example method of generating a digital signature for scan data collected by a laser scanner according to at least one embodiment of the present disclosure.

FIG. 6 is a flowchart of an example method 600 of generating a digital signature for scan data collected by a laser scanner according to at least one embodiment of the present disclosure. The method 600 may be performed by any suitable system, apparatus, or device. For example, the data producer 210, the data aggregator 220, the data editor 230, or some combination thereof of FIG. 2 may perform one or more operations associated with the method 600. Although illustrated with discrete blocks, the steps and operations associated with one or more of the blocks of the method 600 may be divided into additional blocks, combined into fewer blocks, or eliminated, depending on the particular implementation.

The method 600 may begin at block 602, where first scan data and second scan data are obtained. The first scan data may involve scan data collected by a first laser scanner, and the second scan data may involve scan data collected by a second laser scanner. The first laser scanner may include a first private key that uniquely corresponds to the first laser scanner, and the second laser scanner may include a second private key that uniquely corresponds to the second laser scanner.

At block 604, a first digital signature corresponding to the first scan data and a second digital signature corresponding to the second scan data may be obtained. The first digital signature may be generated based on the first scan data and the first private key, and the second digital signature may be generated based on the second scan data and the second private key.

At block 606, the first digital signature may be validated using a first public key that corresponds to the first private key, and the second digital signature may be validated using a second public key that corresponds to the second private key. In some embodiments, the pair of the first private key and the first public key and the pair of the second private key and the second public key may be generated as described in relation to the public key 316 of FIG. 3.

At block 608, a report that summarizes the results of the validating of the first digital signature and the second digital signature may be generated. The report may indicate whether the first digital signature was successfully validated using the first public key and whether the second digital signature was successfully validated using the second public key, in which case the digital chain of custody may be considered secured and verified.

At block 610, the first scan data and the second scan data may be aggregated as aggregated scan data. In some embodiments, aggregation of the first scan data and the second scan data may involve a data aggregator, such as the data aggregator 220 of FIG. 2 or the data register 420 of FIG. 4. In these and other embodiments, aggregation of the first scan data and the second scan data may involve combining laser scan data points corresponding to the first scan data and the second scan data and spatially organizing the combined laser scan data points.

At block 612, a third digital signature corresponding to the aggregated scan data may be generated in which the third digital signature is generated by digitally signing hashes of the aggregated scan data using a third private key that corresponds to the scan data aggregator that output the aggregated scan data.

Modifications, additions, or omissions may be made to the method 600 without departing from the scope of the disclosure. For example, the designations of different elements in the manner described is meant to help explain concepts described herein and is not limiting. Further, the method 600 may include any number of other elements or may be implemented within other systems or contexts than those described.

Figure 7:
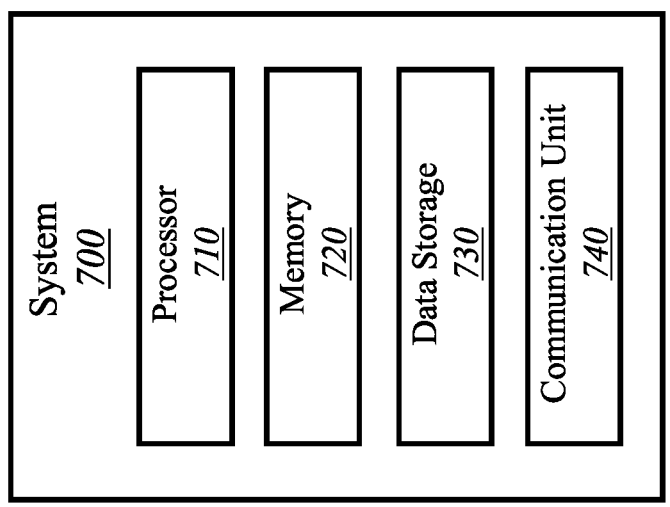
FIG. 7 is an example computer system.

FIG. 7 is an example computer system 700, according to at least one embodiment described in the present disclosure. The computing system 700 may include a processor 710, a memory 720, a data storage 730, and/or a communication unit 740, which all may be communicatively coupled. Any or all of the laser scanner 100 of FIG. 1, the data flow 200 of FIG. 2, the single data verification process 300 of FIG. 3, or the digital chain of custody 400 of FIG. 4 may be implemented as a computing system consistent with the computing system 700.

Generally, the processor 710 may include any suitable special-purpose or general-purpose computer, computing entity, or processing device including various computer hardware or software modules and may be configured to execute instructions stored on any applicable computer-readable storage media. For example, the processor 710 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data.

Although illustrated as a single processor in FIG. 7, it is understood that the processor 710 may include any number of processors distributed across any number of network or physical locations that are configured to perform individually or collectively any number of operations described in the present disclosure. In some embodiments, the processor 710 may interpret and/or execute program instructions and/or process data stored in the memory 720, the data storage 730, or the memory 720 and the data storage 730. In some embodiments, the processor 710 may fetch program instructions from the data storage 730 and load the program instructions into the memory 720.

After the program instructions are loaded into the memory 720, the processor 710 may execute the program instructions, such as instructions to cause the computing system 700 to perform the operations of the method 600 of FIG. 6. For example, the computing system 700 may execute the program instructions to obtain first scan data and second scan data, obtain a first digital signature and a second digital signature, validate the first and the second digital signatures, generate a report that summarizes the results of the validation, aggregate the first scan data and the second scan data, or generate a third digital signature corresponding to the aggregated data.

The memory 720 and the data storage 730 may include computer-readable storage media or one or more computer-readable storage mediums for having computer-executable instructions or data structures stored thereon. Such computer-readable storage media may be any available media that may be accessed by a general-purpose or special-purpose computer, such as the processor 710. For example, the memory 720 and/or the data storage 730 may include signed dataset 215, 225, and 235 of FIG. 2; the scan data 312, the hash codes 134, the public key 316, the signature data 318, the manifest 322, and the second manifest 324 of FIG. 3; the signed dataset 415, the verification report 422, the aggregated file 424, the verification report 432, the providence trace 434, and the multi-signed file 436 of FIG. 4; the nested signed-save data 500 of FIG. 5; or some combination thereof. In some embodiments, the computing system 700 may or may not include either of the memory 720 and the data storage 730.

By way of example, and not limitation, such computer-readable storage media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to store desired program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 710 to perform a particular operation or group of operations.

The communication unit 740 may include any component, device, system, or combination thereof that is configured to transmit or receive information over a network. In some embodiments, the communication unit 740 may communicate with other devices at other locations, the same location, or even other components within the same system. For example, the communication unit 740 may include a modem, a network card (wireless or wired), an optical communication device, an infrared communication device, a wireless communication device (such as an antenna), and/or chipset (such as a Bluetooth device, an 802.6 device (e.g., Metropolitan Area Network (MAN)), a WiFi device, a WiMax device, cellular communication facilities, or others), and/or the like. The communication unit 740 may permit data to be exchanged with a network and/or any other devices or systems described in the present disclosure. For example, the communication unit 740 may allow the system 700 to communicate with other systems, such as computing devices and/or other networks.

One skilled in the art, after reviewing this disclosure, may recognize that modifications, additions, or omissions may be made to the system 700 without departing from the scope of the present disclosure. For example, the system 700 may include more or fewer components than those explicitly illustrated and described.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, it may be recognized that changes may be made in form and detail without departing from the scope of the present disclosure. Thus, the present disclosure is limited only by the claims.

In some embodiments, the different components, modules, engines, and services described herein may be implemented as objects or processes that execute on a computing system (e.g., as separate threads). While some of the systems and processes described herein are generally described as being implemented in software (stored on and/or executed by general purpose hardware), specific hardware implementations or a combination of software and specific hardware implementations are also possible and contemplated.

Terms used in the present disclosure and especially in the appended claims (e.g., bodies of the appended claims) are generally intended as "open terms" (e.g., the term "including" should be interpreted as "including, but not limited to.").

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is expressly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase preceding two or more alternative terms, whether in the description, claims, or drawings, should be understood to contemplate the possibilities of including one of the terms, either of the terms, or both of the terms. For example, the phrase "A or B" should be understood to include the possibilities of "A" or "B" or "A and B."

All examples and conditional language recited in the present disclosure are intended for pedagogical objects to aid the reader in understanding the present disclosure and the concepts contributed by the inventor to furthering the art, and are to be construed as being without limitation to such specifically recited examples and conditions. Although embodiments of the present disclosure have been described in detail, various changes, substitutions, and alterations could be made hereto without departing from the spirit and scope of the present disclosure.

What is claimed is:

1. A laser-scanning method, comprising:
   obtaining scan data captured by a laser scanner, the laser scanner including a first private key that uniquely corresponds to the laser scanner;
   obtaining a first digital signature corresponding to the obtained scan data, the first digital signature being generated based on the scan data and the first private key;
   validating the first digital signature using a first public key that corresponds to the first private key;
   generating a report that summarizes results of the validating of the first digital signature;
   transforming and aggregating, by a scan data aggregator, the scan data and any other data captured by the laser scanner as aggregated scan data; and
   generating a second digital signature corresponding to the aggregated scan data, the second digital signature being generated by signing hashes corresponding to the aggregated scan data using a second private key corresponding to the scan data aggregator;
   wherein the first private key corresponding to the laser scanner is located in an off-system data storage and is not stored locally on the laser scanner; and
   the first digital signature is generated by and received from a computer system associated with the off-system data storage that digitally signs hashes provided by the laser scanner using the first private key.

2. The laser-scanning method of claim 1, wherein:
   the first digital signature is generated by signing a collection of hashes corresponding to the first scan data using the first private key; and
   the second digital signature is generated by signing hashes corresponding to the aggregated scan data using the second private key.

3. The laser-scanning method of claim 1, wherein the off-system data storage logs a record of the first digital signature being generated, the record indicating at least one of: a time of the first digital signature being generated and an identity associated with the first private key used to generate the first digital signature.

4. The laser-scanning method of claim 1, further comprising sending the aggregated scan data to a scan data editor, wherein the scan data editor is configured to:
   add elements to the aggregated scan data and edit the aggregated scan data based on user input to generate edited scan data; and
   digitally sign the edited scan data using a third private key that corresponds to a user of the scan data editor.

5. A laser-scanning method, comprising:
   obtaining scan data captured by a laser scanner, the laser scanner including a first private key that uniquely corresponds to the laser scanner;
   obtaining a first digital signature corresponding to the obtained scan data, the first digital signature being generated based on the scan data and the first private key;
   validating the first digital signature using a first public key that corresponds to the first private key;
   generating a report that summarizes results of the validating of the first digital signature;
   transforming and aggregating, by a scan data aggregator, the scan data and any other data captured by the laser scanner as aggregated scan data; and
   generating a second digital signature corresponding to the aggregated scan data, the second digital signature being generated by signing hashes corresponding to the aggregated scan data using a second private key corresponding to the scan data aggregator;
   wherein the scan data editor is further configured to generate a second report that:
      summarizes results of the validating of the first digital signature, the second digital signature, and a third digital signature corresponding to the edited scan data digitally signed using the third private key; and
      indicates a digital chain of custody of each data element included in the edited scan data.

6. A laser-scanning method, comprising:
   obtaining scan data captured by a laser scanner, the laser scanner including a first private key that uniquely corresponds to the laser scanner;
   obtaining a first digital signature corresponding to the obtained scan data, the first digital signature being generated based on the scan data and the first private key;
   validating the first digital signature using a first public key that corresponds to the first private key;
   generating a report that summarizes results of the validating of the first digital signature;
   transforming and aggregating, by a scan data aggregator, the scan data and any other data captured by the laser scanner as aggregated scan data; and
   generating a second digital signature corresponding to the aggregated scan data, the second digital signature being generated by signing hashes corresponding to the aggregated scan data using a second private key corresponding to the scan data aggregator;
   retaining, by the scan data aggregator, the report that summarizes results of the validating of the first digital signature and the second digital signature; and
   discards the scan data captured by the laser scanner after sending the aggregated scan data to a scan data editor.

7. The laser-scanning method of claim 1, wherein the first private key corresponds to a particular user of the laser scanner and the second private key corresponds to a particular user of the scan data aggregator.

8. The laser-scanning method of claim 1, wherein the first private key corresponds to the laser scanner and the second private key corresponds to the scan data aggregator.

9. The laser-scanning method of claim 1, wherein the aggregated scan data includes the scan data having been spatially organized.

10. A system, comprising:
one or more processors;
one or more non-transitory computer-readable storage media configured to store instructions that, in response to being executed, cause the system to perform operations, the operations comprising:
obtaining scan data captured by a laser scanner, the laser scanner including a first private key that uniquely corresponds to the laser scanner;
obtaining a first digital signature corresponding to the obtained scan data, the first digital signature being generated based on the scan data and the first private key;
validating the first digital signature using a first public key that corresponds to the first private key;
generating a report that summarizes results of the validating of the first digital signature;
transforming and aggregating, by a scan data aggregator, the scan data and any other data captured by the laser scanner as aggregated scan data; and
generating a second digital signature corresponding to the aggregated scan data, the second digital signature being generated by signing hashes corresponding to the aggregated scan data using a second private key corresponding to the scan data aggregator;
the first private key corresponding to the laser scanner and the second private key corresponding to the scan data aggregator located in an off-system data storage and are not stored locally on the laser scanner and the scan data aggregator; and
the first digital signature is generated by and received from a computer system associated with the off-system data storage that digitally signs hashes provided by the laser scanner and the scan data aggregator.

11. The system of claim 10, wherein:
the first digital signature is generated by signing hashes corresponding to the first scan data using the first private key; and
the second digital signature is generated by signing hashes corresponding to the aggregated scan data using the second private key.

12. The system of claim 10, further comprising sending the aggregated scan data to a scan data editor, wherein the scan data editor is configured to:
add elements to the aggregated scan data and edit the aggregated scan data based on user input to generate edited scan data; and
digitally sign the edited scan data using a third private key that corresponds to a user of the scan data editor.

13. A system, comprising:
one or more processors;
one or more non-transitory computer-readable storage media configured to store instructions that, in response to being executed, cause the system to perform operations, the operations comprising:
obtaining scan data captured by a laser scanner, the laser scanner including a first private key that uniquely corresponds to the laser scanner;
obtaining a first digital signature corresponding to the obtained scan data, the first digital signature being generated based on the scan data and the first private key;
validating the first digital signature using a first public key that corresponds to the first private key;
generating a report that summarizes results of the validating of the first digital signature;
transforming and aggregating, by a scan data aggregator, the scan data and any other data captured by the laser scanner as aggregated scan data; and
generating a second digital signature corresponding to the aggregated scan data, the second digital signature being generated by signing hashes corresponding to the aggregated scan data using a second private key corresponding to the scan data aggregator;
wherein the scan data editor is further configured to generate a second report that:
summarizes results of the validating of the first digital signature, the second digital signature, and a third digital signature corresponding to the edited scan data digitally signed using the third private key; and
indicates a digital chain of custody of each data element included in the edited scan data.

14. A system, comprising:
one or more processors;
one or more non-transitory computer-readable storage media configured to store instructions that, in response to being executed, cause the system to perform operations, the operations comprising:
obtaining scan data captured by a laser scanner, the laser scanner including a first private key that uniquely corresponds to the laser scanner;
obtaining a first digital signature corresponding to the obtained scan data, the first digital signature being generated based on the scan data and the first private key;
validating the first digital signature using a first public key that corresponds to the first private key;
generating a report that summarizes results of the validating of the first digital signature;
transforming and aggregating, by a scan data aggregator, the scan data and any other data captured by the laser scanner as aggregated scan data; and
generating a second digital signature corresponding to the aggregated scan data, the second digital signature being generated by signing hashes corresponding to the aggregated scan data using a second private key corresponding to the scan data aggregator;
retaining, by the scan data aggregator, the report that summarizes results of the validating of the first digital signature and the second digital signature; and
discards the aggregated scan data after sending the aggregated scan data to a scan data editor.

15. The system of claim 10, wherein the first private key corresponds to a particular user of the laser scanner and the second private key corresponds to a particular user of the scan data aggregator.

16. The system of claim 10, wherein the first private key corresponds to the laser scanner and the second private key corresponds to the scan data aggregator.

17. The system of claim 10, wherein the aggregated scan data includes the scan data having been spatially organized.

* * * * *